(12) United States Patent
Symes et al.

(10) Patent No.: US 10,582,207 B2
(45) Date of Patent: Mar. 3, 2020

(54) VIDEO PROCESSING SYSTEMS

(71) Applicant: Arm Limited, Cambridge (GB)

(72) Inventors: Dominic Hugo Symes, Cambridge (GB); Sven Ola Johannes Hugosson, Lund (SE)

(73) Assignee: Arm Limited, Cambridge (GB)

( * ) Notice: Subject to any disclaimer, the term of this patent is extended or adjusted under 35 U.S.C. 154(b) by 21 days.

(21) Appl. No.: 15/844,823

(22) Filed: Dec. 18, 2017

(65) Prior Publication Data
US 2018/0176590 A1 Jun. 21, 2018

(30) Foreign Application Priority Data

Dec. 20, 2016 (GB) .................................. 1621745.7

(51) Int. Cl.
*H04N 19/436* (2014.01)
*H04N 19/119* (2014.01)
*H04N 19/172* (2014.01)
*H04N 19/423* (2014.01)
*H04N 19/196* (2014.01)

(52) U.S. Cl.
CPC ......... *H04N 19/436* (2014.11); *H04N 19/119* (2014.11); *H04N 19/172* (2014.11); *H04N 19/196* (2014.11); *H04N 19/423* (2014.11)

(58) Field of Classification Search
CPC .. H04N 19/436; H04N 19/196; H04N 19/423; H04N 19/172; H04N 19/119
See application file for complete search history.

(56) References Cited

U.S. PATENT DOCUMENTS 6,559,783 B1 * 5/2003 Stoneking ........... H03M 1/1225
341/120
2009/0245662 A1 10/2009 Ueda

OTHER PUBLICATIONS

Combined Search and Examination Report dated Jun. 12, 2017, GB Patent Application No. GB1621745.7.
Wikipedia contributors, 'Shade', Wikipedia, the Free Encyclopedia, Jan. 2, 2018, 21:27 UTC, <https://en.wikipedia.org/w/index.php?title=Shader&oldid=818316030> [accessed Feb. 5, 2018].
Wikipedia contributors, 'Region of interest', Wikipedia, the Free Encyclopedia, Nov. 27, 2017, 22:25 UTC, <https://en.wikipedia.org/w/index.php?title=Region_of_interest&oldid=812450797> [accessed Feb. 5, 2018].

* cited by examiner

*Primary Examiner* — Nam D Pham
(74) *Attorney, Agent, or Firm* — Vierra Magen Marcus LLP

(57) ABSTRACT

A video processing system includes a host processor, a video encoder and a memory. The host processor sends a configuration message to the video encoder that indicates to the video encoder how to encode a video frame and that includes information indicating the location of encoding configuration data that is stored in the memory. The video encoder receives the configuration message, uses the location indicating information to read the encoding configuration data from the memory, and encodes the video frame in accordance with the encoding configuration data read from the memory.

19 Claims, 9 Drawing Sheets

VIDEO PROCESSING SYSTEMS

BACKGROUND

The technology described herein relates to video processing systems, and in particular to video encoding systems.

In video encoding, video data (e.g. pixel data representing YUV or RGB values for a sequence of video frames) is encoded into an encoded bitstream according to a video encoding format. Typically, a lossy compression scheme is utilised and the degree to which video data is compressed is controllable by specifying values (and settings) for a set of video encoding parameters. Normally, specifying parameter values for a higher degree of compression will lead to smaller file size but a greater loss of image quality, while specifying parameter values for a lower degree of compression will lead to larger file size but better image quality.

FIG. 1 illustrates a typical video encoding system. An application 2 executing on a host processor 1 will request video encoding operations to be performed on video data by an associated video processor (video processing unit (VPU)) 3. To do this, a driver 4 for the video processor 3 that is running on the host processor 1 will provide to the video processor 3 the video data that is to be encoded, as well as instructions to perform the requested video encoding operations on the video data.

FIG. 2 illustrates an arrangement whereby video data and encoding instructions are provided by the host processor 1 to the video processor 3 using a message queue 6. Video data to be encoded is indicated to the video processor 3 by the host processor 1 sending one or more frame messages 20 to the video processor 3 via the message queue 6.

Encoding instructions are provided to the video processor 3 by the host processor 1 sending the encoding instructions to the video processor 3 via the message queue 6 in the form of one or more configuration messages 21. Each configuration message includes configuration data that specifies how the video processor 3 is to (including the encoding parameter values to use to) encode the video data associated with the frame message or frame messages that follow the configuration message in the message queue 6.

A configuration message applies to the following frame message and each subsequent frame message in the message queue 6 until a new configuration message is encountered in the queue 6. Thus, in the example of FIG. 2, the configuration data in configuration message A applies to the video data associated with frame message 0 and frame message 1, while the configuration data in configuration message B applies to the video data associated with frame message 2.

The configurability of video encoding can be increased by defining plural regions of interest ("ROIs") (sub-regions) within a video frame or sequence of video frames to be encoded, and encoding each region of interest according to an associated set of encoding parameter values (and settings). This means, for example, that regions of a video frame that are of particular visual importance, e.g. faces, can be encoded using a lower degree of compression to preserve a higher image quality, while regions where lower image quality is acceptable, e.g. backgrounds, can be encoded using a higher degree of compression.

This is done by the application 2 defining the plural regions of interest and requesting video encoding operations to be performed by the video processor 3 for the plural regions of interest. Driver 4 will send instructions to the video processor 3 that specify the regions of interest, as well as the encoding operations to be performed for a frame (or frames) and each region of interest therein.

FIG. 3 shows a configuration message 31 that can be used to send such region of interest encoding instructions to the video processor 3 via the message queue 6 of FIG. 2. As shown in FIG. 3, the configuration message includes configuration data 32 that defines encoding parameter values (and settings) associated with a frame as a whole (e.g. a "Frame Parameter Record" (FPR)), as well as, for each region of interest in the frame, configuration data 33 that defines the respective region of interest and its associated encoding parameter values (and settings) (e.g. a "Block Parameter Record" (BPR)).

The Applicants believe that there remains scope for improvements to video processing systems.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
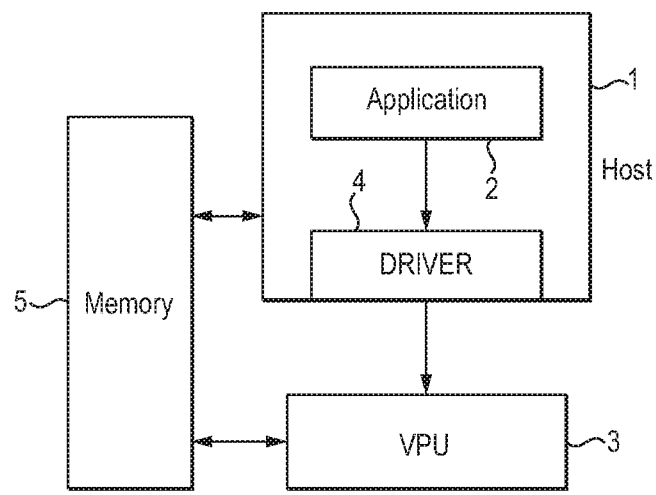
FIG. 1 shows schematically a video processing system.

A first embodiment of the technology described herein comprises a method of operating a video processing system that includes a host processor, a video encoder and a memory, the method comprising:

when encoding video data:

the host processor sending a configuration message to the video encoder, the configuration message indicating to the video encoder how to encode a video frame and including information indicating the location of encoding configuration data stored in the memory; and the video encoder:

receiving the configuration message;

using the location indicating information to read the encoding configuration data from the memory; and encoding the video frame in accordance with the encoding configuration data read from the memory.

A second embodiment of the technology described herein comprises a video processing system, the video processing system comprising:

a host processor;

a video encoder; and a memory;

wherein the host processor is configured to send a configuration message to the video encoder, the configuration message indicating to the video encoder how to encode a video frame and including information indicating the location of encoding configuration data stored in the memory; and the video encoder is configured to:

receive configuration messages sent by the host processor;

use location indicating information in a received configuration message to read encoding configuration data from the memory; and encode a video frame in accordance with the encoding configuration data read from the memory.

In the technology described herein a host processor sends to a video encoder configuration messages that indicate to the video encoder how the video encoder is to encode a (e.g. the following) video frame (or frames). In contrast with known arrangements however, the configuration messages in the technology described herein include information (e.g. and in an embodiment, a pointer (or pointers)) indicating the location of encoding configuration data that is stored in a memory.

This means that, in contrast with known arrangements, configuration messages do not need to include all of the encoding configuration data that is necessary to indicate to the video encoder how to encode a video frame. Rather, some or all of the encoding configuration data can be stored in a memory, and information indicating the location of the stored encoding configuration data can be included in a configuration message instead of the encoding configuration data itself.

As will be discussed further below, this means, for example, that the amount of data in a configuration message that is necessary to specify a region of interest and its associated encoding parameter values (and settings) can be reduced compared to known arrangements. Accordingly, it is possible to include data for a greater number of regions of interest in a configuration message of a particular size. This means that it is possible to achieve finer grain encoding configurability compared to known arrangements, without, for example, increasing configuration message size or the number of configuration messages.

The Applicants have recognised that in known arrangements where configuration messages include all of the encoding configuration data that is necessary to indicate to a video encoder how to encode a following video frame, the amount of data that is included in configuration messages is relatively large and increases quickly with number of regions of interest. Due to system limitations such as, for example, bandwidth and latency, this has the effect of limiting the number of regions of interest that can be implemented by the system, thereby preventing finer grain encoding configurability. This effect is particularly severe in modern mobile devices such as smart phones, tablets, and the like where system resources are restricted.

It will be appreciated, therefore, that the technology described herein provides an improved video processing system.

The host processor can be any suitable and desired host processor that can send (instructions in the form of) configuration messages to the video encoder. In an embodiment, the host processor is a central processing unit (CPU) of the video encoding system.

The host processor can send the configuration messages to the video encoder in any suitable and desired manner. In an embodiment, a driver running on the host processor sends the configuration messages to the video encoder in an embodiment in response to instructions from an application executing on the host processor.

The video encoder can be any suitable and desired video encoder that can encode (video data of) video frames. In an embodiment, the video encoder is a video processing unit (VPU) that is configured (in an embodiment by firmware running on the video processing unit) to encode video data. The video processing unit may also be operable to decode video data and may be configured to do so by (the) firmware running on the video processing unit. In an embodiment, the video encoder (is a video processing unit that) comprises one or more processing cores (e.g. and in an embodiment, one to eight processing cores).

The video encoder will encode video data (e.g. pixel data representing YUV or RGB values for a sequence of video frames) into an encoded (compressed) output (bitstream) according to a video encoding format such as, for example, H.264 or VP9. The encoded output may be further processed, transmitted (e.g. over the internet), and/or stored (e.g. in (the) memory or on an optical disc), etc. as desired. The encoded output may be decoded into video data, and the video data may be displayed as desired, e.g. as a video.

The video encoder can receive the configuration messages sent by the host processor in any suitable and desired manner. In an embodiment, (the) firmware for the video encoder receives the configuration messages sent by the (driver of the) host processor.

In an embodiment, the (driver of the) host processor sends the configuration message to the video encoder by writing the configuration message to a (or the) memory, and the (firmware for the) video encoder then receives the configuration message by reading the configuration message from the memory.

The memory can be any suitable and desired storage that can store encoding configuration data. As the video encoder reads the encoding configuration data from the memory, the memory should be, at least as far as the encoding configuration data is concerned, read accessible by the video encoder (and may also be write accessible by the video encoder). As will be discussed below, the memory is in an embodiment also at least write accessible by the host processor.

The memory may be an on chip memory (i.e. on the same chip as the host processor and/or the video encoder) or it may be an external (main) memory (i.e. not on the same chip as the host processor and/or the video encoder). Where the memory is an external memory, it may be connected to the host processor and/or to the video encoder by a suitable interconnect. The memory may be a dedicated memory for storing the configuration data or it may be part of a memory that is used for other data as well.

The (and each) video frame will typically be represented as a rectangular array of pixels (picture elements) representing an image, where the colour value to be used for each pixel is indicated using an appropriate colour space, e.g. the YUV or RGB colour space.

A video frame can be provided to the video encoder for encoding in any suitable and desired manner. For example, the video frame(s) may be read by the video encoder from a memory (e.g. the memory storing the encoding configuration data), or the video frame(s) may be sent to the video encoder for encoding.

The host processor could send (video data of) the video frame(s) to be encoded directly to the video encoder. However, in an embodiment, the (driver for the) host processor (in response to instructions from an (or the) application executing on the host processor) provides (video data of) the video frame(s) to the (firmware for the) video encoder by sending to the (firmware for the) video encoder information (e.g. and in an embodiment, a pointer (or pointers)) indicating the location of (video data of) the video frame(s) stored in a (or the) memory. Correspondingly, the (firmware for the) video encoder in an embodiment receives the information indicating the location of (video data of) the video frame(s) stored in the memory, and then reads (video data of) the video frame(s) stored in the memory using that information.

Where (video data of) the video frame(s) to be encoded is read from the memory by the video encoder, then (the video data of) the video frame(s) can be written to the memory in any suitable and desired manner. However, in an embodiment, (the video data of) the video frame(s) is written to the memory from an image signal processor or camera interface.

The (and each) configuration message indicates to the video encoder how to encode the video frame(s). The configuration message can be generated as desired. In an embodiment, it is generated by (a (or the) driver running on) the host processor, e.g. and in an embodiment, in response to instructions from (an (or the) application executing on) the host processor. A (and each) configuration message could apply to only a single (e.g. the following) video frame or to a plurality (e.g. a sequence of) video frames.

The configuration message contains (at least) information indicating the location of encoding configuration data that is stored in the memory. The location indicating information can be any suitable and desired information that can indicate the location of the encoding configuration data stored in the memory and that the video encoder can use to read the encoding configuration data from the memory. In an embodiment, the location indicating information comprises a pointer that points to the location of the encoding configuration data stored in the memory. Such a pointer can take any suitable and desired form, e.g. as an index indicating a location in memory, etc.

In an embodiment, the location indicating information comprises a pointer and information indicating the location of the encoding configuration data in the memory relative to the location indicated by the pointer. For example, in an embodiment, the location indicating information comprises a descriptor that includes a pointer pointing to a start memory location and a number (length) of following data bytes to read.

In an embodiment, the (and each) configuration message also includes further information, such as, and in an embodiment, some encoding configuration data (as well as there being encoding configuration data that is stored in the memory). In this case, the encoding configuration data that is included in the configuration message in an embodiment comprises (and in an embodiment only comprises) encoding configuration data that is associated with (and to be used for) the video frame(s) as a whole, such as data defining the frame type, frame level quantisation parameters, and maximum motion vector range, etc. (It will be appreciated however, that some or all of the encoding configuration data that is associated with the video frame(s) as a whole could also or instead be stored in the memory, for example.)

Correspondingly, not all of the encoding configuration data that the video frame(s) is to be encoded in accordance with need be stored in the memory, but only some but not all of the encoding configuration data that the video frame(s) is to be encoded in accordance with may be stored in the memory.

The encoding configuration data (whether stored in the memory or included in the configuration message) can be any suitable and desired data that can control (affect) the encoding of the video data.

As with the configuration message, the encoding configuration data can be generated as desired. For example, it could be predetermined, e.g. generated before video data is to be encoded. It is in an embodiment generated by (a (or the) driver running on) the host processor, e.g. in response to instructions from (an (or the) application executing on) the host processor.

Similarly, encoding configuration data can be stored in the memory as desired. It may be already present in the memory, e.g. before video data is to be encoded, or it could be written to the memory, e.g. and in an embodiment by (a (or the) driver running on) the host processor, e.g. in response to instructions from (an (or the) application executing on) the host processor. Thus in an embodiment, the host processor writes the encoding configuration data to the memory.

Similarly, encoding configuration data can be included in the configuration message as desired. It is in an embodiment included in the configuration message by (a (or the) driver running on) the host processor in response to instructions from (an (or the) application executing on) the host processor.

In an embodiment a (and in an embodiment each) video frame is divided into one or more sub-regions for encoding purposes, such that each sub-region can have a respective set of encoding parameters and conditions specified for it. In an embodiment a video frame is divided into plural sub-regions.

Each sub-region can have any desired size, shape or position within the video frame(s). There could be overlapping sub-regions, and/or the one or more sub-regions could not cover the entire video frame.

In an embodiment, the video frame (and in an embodiment each video frame of a sequence of video frames being encoded) is divided into a plurality of non-overlapping, regularly sized and shaped, sub-regions that (in an embodiment) cover the entire video frame. Each such sub-region is in an embodiment rectangular (and in an embodiment square), and in an embodiment 8×8, 16×16, or 32×32 pixels in size.

In an embodiment, the sub-regions that the (and each) video frame is divided into comprise respective processing tiles that the video encoder will operate on when encoding the video frame. In this case, each such processing tile (and thus encoding sub-region) is in an embodiment rectangular (and in an embodiment square), and in an embodiment 8×8, 16×16, or 32×32 pixels in size.

Where a video frame is divided into plural sub-regions for encoding purposes, then in an embodiment encoding configuration data indicating how each sub-region is to be encoded is provided. There may be a separate set of encoding configuration data for each sub-region, or, as will be discussed further below, some or all of the sub-regions could share a set of sub-region encoding configuration data.

Thus, in an embodiment, the video frame or frames are divided into plural sub-regions for encoding purposes, and each sub-region has an associated set of sub-region encoding configuration data that indicates how the sub-region is to be encoded (which may be shared with other sub-regions), and which, e.g., and in an embodiment, specifies one or more encoding parameters for the sub-region.

Thus, the encoding configuration data (whether stored in the memory or included in the configuration message) in an embodiment includes sub-region encoding configuration data that the video encoder is to encode one or more sub-regions within the video frame(s) in accordance with, such as data defining the sub-region type, sub-region level quantisation parameters, and search areas, etc. This may be in addition to or alternatively to the encoding configuration data that is associated with the video frame(s) as a whole.

In an embodiment, the sub-region encoding configuration data is stored in the memory (and correspondingly the encoding configuration data that is stored in the memory comprises at least (and in an embodiment only) (a set or sets of) sub-region encoding configuration data).

Where the encoding configuration data that a video frame(s) is to be encoded in accordance with comprises both encoding configuration data that is associated with the video frame(s) as a whole and sub-region encoding configuration data, then in an embodiment the encoding configuration data is divided between the memory and the configuration message, in an embodiment by storing the sub-region encoding configuration data in the memory, and by including the encoding configuration data that is associated with the video frame(s) as a whole in the configuration message.

Thus, in an embodiment, the configuration message includes information indicating the location of sub-region encoding configuration data that is stored in the memory. The configuration message in an embodiment also includes encoding configuration data that is associated with and to be used for the video frame(s) as a whole. This arrangement allows the amount of per sub-region data that needs to be included in a configuration message to be reduced, for example.

Other arrangements would, of course, be possible.

Where a video frame is divided into sub-regions for encoding purposes, then the respective sub-regions will need to be and are in an embodiment defined, e.g. in terms of their shape, size and position within the video frame(s), so that the video encoder can identify the respective sub-regions when it is encoding the video frame.

The video encoder can be provided with the definitions of the one or more sub-regions in any suitable and desired manner. For example, the video encoder could be provided with an explicit description, e.g. in terms of its x and y coordinates within the video frame, of a and each sub-region, for example by including data indicating the size, shape and position of the sub-regions in the configuration messages and/or in the encoding configuration data that is stored in the memory. For example, each set of sub-region encoding configuration data could also include a description of the sub-region that it applies to.

However, in an embodiment, the (and each) video frame is divided into a predefined array of, in an embodiment identically sized and shaped (configured), sub-regions (e.g. and in an embodiment, into a predefined array of square sub-regions ("tiles") as discussed above), and the video encoder is aware of this subdivision, such that there is no need to further define the sub-regions in the configuration messages or configuration data, for example. In one such embodiment, the (and each) video frame is divided into an array of square, non-overlapping sub-regions, each of which has an associated set of sub-region encoding configuration data.

This then means that a definition of each of the one or more sub-regions does not need to be included in the configuration message and/or encoding configuration data. Accordingly, the amount of per sub-region data can be reduced.

In such an arrangement (and where otherwise required), it will still be necessary for the video encoder to know which set of sub-region configuration data applies to which sub-region. Again, this can be indicated as desired. For example, each set of sub-region configuration data could also include an indication of the sub-region or sub-regions that it is to be used for.

However, in an embodiment, the association of sub-region configuration data to sub-regions within a video frame being encoded is not indicated explicitly in the configuration message or the sub-region encoding configuration data, but is indicated implicitly, such that the video encoder can identify which set of sub-region encoding configuration data to use for a sub-region without the need for that to be explicitly specified in the configuration message or sub-region encoding configuration data.

In an embodiment, this is achieved by the video encoder encoding the sub-regions that the video frame has been divided into for encoding purposes in a particular, in an embodiment selected, in an embodiment predefined order (sequence), such as, and in an embodiment, a raster order, and arranging the (sets of) sub-region encoding configuration data correspondingly in the particular, in an embodiment selected, in an embodiment predefined, e.g., and in an embodiment raster, order that the video encoder will process the sub-regions of the video frame in, such that the sub-region encoding configuration data is listed (provided) in the order that the video encoder will encode the sub-regions in.

It would be possible, as discussed above, to include a separate set of sub-region encoding configuration data for each sub-region that the video frame has been divided into for encoding purposes. For example, a separate set of sub-region encoding configuration data could be stored in the memory for each sub-region that the video frame has been divided into (e.g. in turn). In this case therefore the number of sets of sub-region encoding configuration data that is stored, e.g. in the memory, will correspond to the number of sub-regions that the video frame has been divided into for encoding purposes.

However, the Applicants have recognised that there could be different sub-regions that are to be encoded in the same way, and that in that case, there may be sets of sub-region encoding configuration data that are the same. The Applicants have further recognised that in this case it would be possible to reduce (compress) the amount of sub-region encoding configuration data (e.g. stored in the memory) by maintaining (storing) (only) a single copy of a set of sub-region encoding configuration data that is the same for different sub-regions. The different sub-regions can then be encoded in accordance with the same single copy of the set of sub-region encoding configuration data.

Thus, in an embodiment, where two or more different sub-regions are to be encoded in the same way (and thus will use the same sub-region encoding configuration data), then those sub-regions share the same set of sub-region encoding configuration data. Thus, in an embodiment, the sub-region encoding configuration data is organised such that where two or more sub-regions of a video frame are to be encoded using the same encoding conditions, those sub-regions to be encoded can (and in an embodiment do) share the same set of sub-region encoding configuration data (use the same set of sub-region encoding configuration data in common).

In such an arrangement there would, e.g., be a single set of sub-region encoding configuration data to be used when encoding plural different sub-regions stored in the memory, and the location indicating information included in the configuration message could be configured to indicate the location of that single copy of the set of sub-region encoding configuration data for each of the different sub-regions that is to use that sub-region encoding configuration data.

In this case therefore the number of sets of sub-region encoding configuration data that are stored in the memory will be less than the number of sub-regions that the video frame has been divided into for encoding purposes.

In one such embodiment, where the sub-regions are to be encoded in a particular, known, order (sequence), then adjacent sub-regions in that order that have the same encoding configuration settings, share the same set of sub-region encoding configuration data.

Thus, in an embodiment, where sets of sub-region encoding configuration data are stored in an order that corresponds to the order that the sub-regions will be encoded in, then one or more, and, in an embodiment any, sequences of adjacent sub-regions that will be encoded using the same encoding configuration data in the sub-region encoding sequence order are identified, and for each such sequence a single copy of the set of sub-region encoding configuration data is stored, together with an indication of how many sub-regions that set of encoding configuration data is to be used for (a count), in an embodiment by using a run length encoding compression scheme.

This allows the sets of sub-region encoding configuration data that is stored in the memory to be stored in a compressed form.

The Applicants have recognised that such a, e.g. run length encoding, compression scheme will be particularly effective where the sub-region encoding configuration data comprises many and/or long sequences of repeated sets of sub-region encoding configuration data, such as is likely to be the case where there are sets of sub-region encoding configuration data for many small sub-regions.

Where respective sets of sub-region encoding configuration data are stored in the memory for use when encoding a video frame, then the configuration message could include a respective set of information (e.g. a pointer) indicating the location of the sub-region encoding configuration data for each set of sub-region encoding configuration data that is stored in the memory.

However, in an embodiment, the configuration message does not include information indicating the location of each set of sub-region encoding configuration data stored in the memory explicitly, but instead includes information indicating the location in the memory of sub-region encoding configuration data for respective groups of the sub-regions that the frame has been divided into for encoding purposes. In other words, in an embodiment, the configuration message includes, in an embodiment plural, sets of information indicating the location of encoding configuration data stored in the memory, with each set of location indicating information indicating the location of encoding configuration data stored in the memory for a respective group of the sub-regions of the set of plural sub-regions that the video frame is to be divided into for encoding purposes.

In an embodiment, the (entire) set of sub-regions that the video frame is divided into for encoding purposes is divided into plural groups of sub-regions (with each group of sub-regions in an embodiment containing plural sub-regions), and a set of location indicating information (such as a pointer) that indicates the location of sub-region encoding configuration data stored in the memory to be used for the group of sub-regions is included in the configuration message for each group of sub-regions.

Thus, the configuration message will contain one set of location indicating information (such as a pointer), for each group of sub-regions for which corresponding sub-region encoding configuration data is stored in the memory.

In an embodiment each group of sub-regions contains the same number of sub-regions and has the same configuration of sub-regions as the other groups (although this is not essential). In an embodiment, each group comprises all or part of a respective row of sub-regions, and in an embodiment a complete row of sub-regions (i.e. a row of sub-regions that extends from the (horizontal) start to the end of the frame). In this case therefore the set of sub-regions for the frame will be divided into as many groups of sub-regions as there are rows of sub-regions in the frame.

Other arrangements would, of course, be possible.

The encoding configuration data that is stored in the memory for a respective group of sub-regions should, and in an embodiment does, contain sufficient sets of sub-region encoding configuration data as are necessary for the sub-regions in the group. Thus, where the groups of sub-regions comprise rows of sub-regions, the will be a set of sub-region encoding configuration data for each sub-region in the group (e.g. row) (although as discussed above, the respective group sub-region encoding configuration data may be compressed, e.g. using run length encoding, so as to remove any duplication and/or repetition in that data).

In these arrangements where the set of sub-regions for a video frame is divided into plural groups of sub-regions, then a separate set of encoding configuration data could be stored in the memory for each respective group of sub-regions (i.e. such that there would be one set of encoding configuration data stored in the memory for each group of sub-regions).

However, the Applicants have again recognised that different groups (e.g. rows) of sub-regions may in fact fall to be encoded in the same manner. In this case therefore, two or more groups of sub-regions could again share (use in common) the same encoding configuration data that is stored in the memory.

Thus, in an embodiment, where two or more different groups of sub-regions are to be encoded in the same way (and thus will use the same encoding configuration data), then those groups of sub-regions share the same encoding configuration data in memory. Thus, in an embodiment, the encoding configuration data is organised in memory such that where two or more groups of sub-regions of a video frame are to be encoded using the same encoding conditions, those groups of sub-regions to be encoded can (and in an embodiment do) share the same set of encoding configuration data stored in the memory (use the same set of encoding configuration data stored in the memory in common).

In such an arrangement there would, e.g., be a single set of encoding configuration data stored in the memory that will be used when encoding plural different groups of sub-regions of the frame. Correspondingly, the location indicating information for the respective different groups of sub-regions included in the configuration message should be, and is in an embodiment, configured to indicate the location of that single copy of the encoding configuration data in the memory for each of the different groups of sub-regions that is to use that encoding configuration data.

In this case therefore the number of sets of "group" encoding configuration data that is stored in the memory would be less than the number of groups of sub-regions that the video frame has been divided into for encoding purposes (although there should still be, and is still in an embodiment, one set of location indication information for each different group of sub-regions in the configuration message). Correspondingly, in an embodiment, two or more sets of location indicating information for respective groups of sub-regions that are being encoded can, and in an embodiment do, indicate (point to) the same location in the memory for the encoding configuration data (i.e. point to the same set of encoding configuration data in the memory).

Such arrangements where the sub-regions are organised into respective groups of sub-regions for encoding purposes, also facilitate encoding video frames where the video encoder comprises plural processing cores that can encode sub-regions of a video frame in parallel. In this case, respective groups of sub-regions could be and are in an embodiment assigned to different processing cores for encoding, as the respective processing cores can identify and use the sub-region encoding configuration data that is stored in the memory for their respective group of sub-regions independently of the other processing cores. In this case therefore different groups of sub-regions can be encoded in parallel using plural different processing cores, with each processing core encoding a respective group of sub-regions.

Although the above has been described with particular reference to a single configuration message and a single video frame, it will appreciated that there may be plural videos frames (e.g. a sequence of plural video frames of a video) and/or plural configuration messages.

Thus, in an embodiment there are plural video frames to be encoded and plural configuration messages, and each configuration message is associated with (indicates to the video encoder how to encode each video frame of) a subset of one or more of the plural videos frames to be encoded. To facilitate this, it is in an embodiment possible to indicate to the video encoder which of the plural video frames are associated with a given configuration message. This can be achieved as desired. For example, each configuration message could explicitly include information indicating which video frame(s) it is associated with.

However, in an embodiment, the association between configuration messages and video frames is implied by the order in which configuration messages are received by the video encoder, such that each configuration message indicates to the video encoder how to encode the following video frame and each subsequent video frame until the video encoder receives a new configuration message. The new configuration message then applies to the following video frame or frames until another new configuration message is received by the video encoder, and so on.

Thus in an embodiment, the (or each) configuration message indicates to the video encoder how to encode the following video frame and each subsequent video frame until the video encoder receives a new configuration message. Correspondingly, the (or each) video frame is in an embodiment encoded by the video encoder in accordance with the encoding configuration data read from the memory using the location indicating information included in the previous configuration message received by the video encoder.

To facilitate this operation, each configuration message is in an embodiment sent to the video encoder via a message queue. Correspondingly, each configuration message is in an embodiment received by the video encoder from the host processor via the message queue. Thus in an embodiment, the video processing system further comprises a message queue.

In an embodiment, the (or each) configuration message is sent to the video encoder by adding the (respective) configuration message to the end of a message queue, wherein each message in the message queue leaves the message queue in the order that it was added to the message queue, such that when the (respective) configuration message reaches the front on the message queue, it leaves the message queue and is received by the video encoder.

In an embodiment, video frames to be encoded are provided to the video encoder using a message queue. In an embodiment, this is achieved by adding one or more frame messages to a message queue, with each frame message indicating one or more video frames to be encoded. In an embodiment, each frame message indicates only one video frame to be encoded (and, correspondingly, each video frame to be encoded is in an embodiment associated with only one frame message).

Frame messages could include all of the video data for associated video frames. However, a frame message may not include all of the video data to be encoded, or indeed any video data at all. Instead, in an embodiment, a frame message includes information (e.g. and in an embodiment, a pointer (or pointers)) indicating the location of video data to be encoded that is stored elsewhere, for example in a memory (e.g. the memory storing the encoding configuration data). The video encoder then uses that information to read the video data to be encoded and then encode the video data that it has read.

In an embodiment, (video data of) each video frame to be encoded is stored in a (or the) memory as a plane of luma (Y) information and a plane of chroma (UV) information. Each frame message then in an embodiment includes information (e.g. and in an embodiment, a pointer) indicating the location in memory of a plane of luma (Y) information and information (e.g. and in an embodiment, a pointer) indicating the location in memory of a plane of chroma (UV) information for each associated video frame.

Thus in an embodiment, a video frame to be encoded is provided to the video encoder by adding an associated frame message to the end of a message queue, wherein each message in the message queue leaves the message queue in the order that it was added to the message queue, such that when the frame message reaches the front on the message queue, it leaves the message queue and (the video data of) the associated video frame is provided to the video encoder.

The message queue that is used to send configuration messages to the video encoder and the message queue that is used to send frame messages to the video encoder could be different message queues. However, in an embodiment, configuration messages and frame messages are sent to the video encoder via the same single message queue, and configuration messages indicate to the video encoder how to encode the video frame(s) associated with the next frame message in the message queue, and each subsequent frame message, until a new configuration message is received by the video encoder from the message queue.

In an embodiment, the message queue is stored in a (or the) memory and is in an embodiment fixed in size. Thus in an embodiment, the (driver of the) host processor sends the (or each) configuration message and/or the (or each) frame message to the video encoder by writing the (respective) message to a message queue stored in a (or the) memory, and the (firmware for the) video encoder then receives the (or each) configuration message and/or the (or each) frame message by reading the (respective) message from the message queue stored in the memory.

Where the host processor sends messages to the video encoder via a message queue, then in an embodiment, when a new message has been added to the message queue the (driver of the) host processor sends an interrupt message to the (firmware for the) video encoder indicating that a new message has been added to the message queue. The (firmware for the) video encoder then receives (reads) the new message from the message queue upon receiving the interrupt message. In an embodiment, the host processor sends the interrupt message to the video encoder by writing to a register that is in an embodiment part of the video encoder.

In one embodiment, the encoding configuration data that the video frame(s) is to be encoded in accordance with is data that directly defines how to encode the video frame(s), e.g. by explicitly defining values of (and settings for) encoding parameters to use to encode the video frame(s) (such as frame type, frame level quantisation parameters, maximum motion vector range, sub-region type, sub-region level quantisation parameters, and search areas, etc., e.g. as described above).

However, in another embodiment the encoding configuration data that the video frame(s) is to be encoded in accordance with is data that indirectly defines how to encode the video frame(s). For example, in an embodiment, the encoding configuration data that the video frame(s) is to be encoded in accordance with defines values of parameters to be used as inputs and/or configuration settings for a program to be executed by the video encoder, wherein the output of the program directly defines how to encode the video frame(s), e.g. and in an embodiment by generating values of (and settings for) encoding parameters to be used to encode the video frame(s). Such a program is, in an embodiment, sent by the host processor to the video encoder, in an embodiment by including the program in a configuration message, or by including in a configuration message information (e.g. and in an embodiment, a pointer (or pointers)) indicating the location of the program stored in a (or the) memory.

It is believed that the idea of a host processor sending to a video encoder a program to be executed by the video encoder to generate values of (and settings for) encoding parameters to use to encode a video frame is novel and inventive in its own right.

Thus, a third embodiment of the technology described herein comprises a method of operating a video processing system that includes a host processor and a video encoder that is configured by firmware running on the video encoder to encode video data, the method comprising:

when encoding video data:

the host processor sending a configuration message to the video encoder, the configuration message indicating instructions to be executed by the video encoder to generate encoding configuration data;

the firmware running on the video encoder reading the instructions indicated by the configuration message; and the video encoder:

executing the instructions read by the firmware to generate encoding configuration data; and encoding a video frame using the generated encoding configuration data.

A fourth embodiment of the technology described herein comprises a video processing system, the video processing system comprising:

a host processor; and a video encoder that is configured by firmware running on the video encoder to encode video data;

wherein the host processor is configured to send a configuration message to the video encoder, the configuration message indicating instructions to be executed by the video encoder to generate encoding configuration data;

the firmware running on the video encoder is configured to read instructions indicated by a configuration message; and the video encoder is further configured to:

execute instructions read by the firmware to generate encoding configuration data; and encode a video frame using the generated encoding configuration data.

As will be appreciated by those skilled in the art, these embodiments of the technology described herein can and in an embodiment do include one or more, and in an embodiment all, of the optional features of the technology described herein described herein, as appropriate.

In these embodiments a host processor sends to a video encoder a configuration message indicating instructions (e.g. and in an embodiment, a program or a script) to be executed by the video encoder. Firmware running on the video encoder reads the instructions indicated by the configuration message, and the video encoder then executes the instructions read by the firmware to generate (output) encoding configuration data (e.g. and in an embodiment comprising data that explicitly defines values of (and settings for) encoding parameters to use to encode the video frame(s)), and the video encoder then (directly) uses the generated encoding configuration data to encode a (e.g. the following) video frame(s).

This means, for example, that some or all of the encoding configuration data that is used to encode the video frame(s) does not need to be directly provided by the host processor, but can also or instead be generated by the video encoder executing the instructions, e.g. and in an embodiment based on the context of the video encoding operations that it is performing. Thus, for example, encoding configuration data could be generated based on the content of and/or encoding properties of video data that is being encoded and/or that is related to the video data being encoded. In this way, context (and content) dependent encoding configurability can be achieved. Furthermore, the instructions can be (and in an embodiment are) provided by an application (and thus the application programmer) of or using the video processing system. This means, for example, that the application (the application programmer) can tailor the operation of the instructions to the particular encoding operations desired. Accordingly, a greater level of encoding configurability can be achieved.

The firmware running on the video encoder can be any suitable and desired firmware that can configure the video encoder (video processing unit) to encode video data. It is in an embodiment installed on the video encoder at the start of a video encoding session, i.e. before video data for the video encoding session is encoded. The video encoder then executes (runs) the firmware to configure the video encoder to encode the video data for the video encoding session.

The host processor can send the configuration message to the video encoder in any suitable and desired manner. In an embodiment, a (or the) driver running on the host processor sends the configuration message to the video encoder in an embodiment in response to instructions from an (or the) application executing on the host processor. In an embodiment, (the) firmware for the video encoder receives the configuration message sent by the (driver of the) host processor.

In an embodiment, the configuration message is sent to the video encoder (and received by the video encoder) via a (or the) message queue. Thus, in an embodiment, a configuration message is added to a (or the) message queue and indicates the instructions that the video encoder is to execute to generate the encoding configuration data to use to encode the following video frame and each subsequent video frame until the video encoder receives a new configuration message. The new configuration message then applies to the following video frame or frames until another new configuration message is received by the video encoder, and so on.

The configuration message can indicate the instructions to be executed by the video encoder in any suitable and desired manner. In an embodiment, the configuration message includes (at least some of or all of) the instructions to be executed by the video encoder, and the firmware running of the video encoder then reads the instructions from the configuration message. Additionally or alternatively, the configuration message in an embodiment includes information (e.g. and in an embodiment, a pointer (or pointers)) indicating the location of (at least some of or all of) the instructions that are stored elsewhere, for example in a (or the) memory. The firmware running on the video encoder then uses that information to read the instructions from the memory.

The instructions can be any suitable and desired instructions that the video encoder can execute. They are in an embodiment a program (e.g. a compiled binary (that is e.g., executed natively) or an interpreted program) or a script. It will be appreciated that the instructions are distinct from and should not be confused with the firmware.

Where a video frame is divided into one or more sub-regions (e.g. as described above), then the video encoder in an embodiment executes the instructions at least once for each of the one or more sub-regions to generate (sub-region) encoding configuration data to use to encode the respective sub-region.

In an embodiment, the instructions are executed by the video encoder by (the) firmware for the video encoder calling the instructions as appropriate, e.g. at appropriate entry points and/or at appropriate times, e.g. using a dispatch table. In an embodiment, the instructions are wrapped by (the) firmware for the video encoder. This means, for example, that the firmware for the video encoder can be fixed firmware and a greater level of encoding configurability can be achieved without, for example, modifying the firmware for the video encoder. Accordingly, a greater level of encoding configurability can be provided without, for example, having to provide support for custom firmware.

In an embodiment, the instructions are executed by the video encoder using restricted resources of the video encoder, e.g. by a specific processing core and/or microcontroller and/or using, for example, only non-protected sessions, etc. This means, for example, that the instructions can be "sandboxed" so that executing the instructions does not impact upon the performance of other processing by the video encoder.

The video encoder can be provided with any data necessary for the instructions to be executed appropriately, such as values of parameters to be used as inputs, configuration settings, entry points and/or a dispatch table (e.g. as described above), in any suitable and desired manner. Such data could be read by the video encoder from a (or the) memory. However, in an embodiment, such data is sent to the video encoder by the host processor, and is in an embodiment included in a (or the) configuration message, e.g. as a header.

Additionally or alternatively, in an embodiment, the values of parameters to be used as inputs and/or configuration settings for the instructions are provided by the video encoder. This means, for example, that the instructions can be executed based on information that the video encoder has access to (but the host processor may not have access to), such as information regarding the context of encoding operations. Thus, for example, the instructions are in an embodiment executed based on information regarding the content of and/or encoding properties of video data that is being encoded and/or that is related to the video data being encoded. As such, context (and content) dependent encoding configurability can be achieved.

Where the video frame is divided into one or more sub-regions (tiles) and, for each of the one or more sub-regions (tiles), the video encoder executes the instructions at least once to generate (sub-region) encoding configuration data to use to encode the respective sub-region (tile), then in an embodiment, the video encoder provides information about (the content of and/or the encoding properties of) one or more sub-regions (tiles) that are adjacent to a sub-region (tile) being encoded to be used as inputs and/or configuration settings for the instructions, such as quantisation parameters, motion vectors, and prediction modes for the one or more adjacent sub-region(s).

It will be appreciated by those skilled in the art that all of the described embodiments of the technology described herein can, and in an embodiment do, include, as appropriate, any one or more or all of the features described herein.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the components of the video processing system can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, nontransitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

As discussed above, in video encoding, video data (e.g. pixel data representing YUV or RGB values for a sequence of video frames) is encoded into an encoded bitstream according to a video encoding format (video codec). Well known video encoding formats include, for example, H.264 and VP9.

Typically, the video data to be encoded comprises a series of plural video frames of a video, with each video frame being represented as a rectangular array of pixels (picture elements) representing an image, where the colour value to be used for each pixel is indicated using an appropriate colour space, e.g. the YUV or RGB colour space.

FIG. 1 illustrates a video encoding system that may be operated in accordance with the technology described herein. As shown in FIG. 1, the video encoding system comprises a host processor 1 (e.g. a central processing unit (CPU)) and a video processor 3 (video processing unit (VPU)) that is operable to perform video encoding (a video encoder). Typically, the video processor 3 will also be able to perform video decoding, although this is not essential. These may communicate with each other, e.g. via an interconnect, and have access to a memory 5 that may be, for example, an off-chip main memory.

An application 2 executing on the host processor 1 may request video encoding operations to be performed by the video processor 3 (video encoder). To do this, a driver 4 for the video processor that is running on the host processor 1 will provide video data (e.g. a video frame or frames) to be encoded and generate and send messages instructing the video processor 3 to perform the video encoding operations on the video data requested by the application 2, to the video processor 3.

The video processor 3 will receive the messages, and firmware running on the video processor 3 will configure the video processor 3 to perform the requested video encoding operations as appropriate. The video encoder will then encode the video data into an encoded output (bitstream) which may be output as desired, e.g. output for display or stored in the memory 5, etc.

Figure 2:
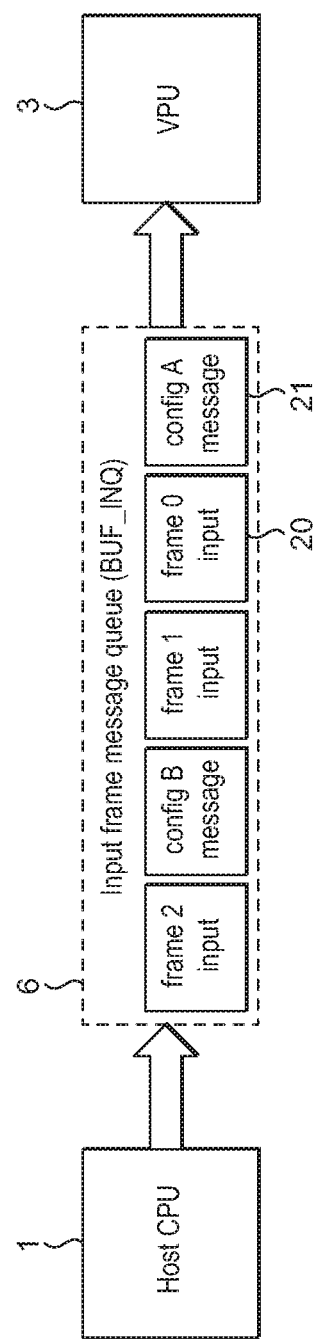
FIG. 2 shows schematically an example of the operation of a message queue in a video processing system.

FIG. 2 illustrates an arrangement whereby video data and encoding instructions are provided by the host processor 1 to the video processor 3 using a fixed size message queue 6 (firmware input data queue) that is stored in the memory 5. As shown in FIG. 2, video data to be encoded is provided to the video processor 3 by the host processor 1 sending one or more frame messages (input frame buffers) 20 (e.g. frame 0, frame 1, frame 2) to the video processor 3 via the message queue 6. Each frame message includes a pointer pointing to the location in the memory 5 of a plane of luma (Y) information, and a pointer pointing to the location in the memory 5 of a plane of chroma (UV) information for a video frame to be encoded. The video processor 3 then uses the pointers included in a frame message to read the YUV information from the memory 5 for a video frame. In this arrangement, operations of the video processor firmware that would otherwise handle such functions (e.g. GOP handling and rate control) may be disabled.

Encoding instructions may also be sent to the video processor 3 via the message queue 6 in the form of one or more configuration messages 21 (e.g. config A, config B). Each configuration message indicates to the video processor 3 how to encode the video data associated with the frame message or frame messages that follow the configuration message in the message queue 6. A configuration message applies to the following frame message and each subsequent frame message in the message queue 6 until a new configuration message is encountered in the queue 6. Thus, in the example of FIG. 2, configuration message A applies to frame messages 0 and 1, while configuration message B applies to frame message 2. This means that configuration messages can be appropriately synchronized with the input video frame data (frame messages).

As discussed above, the configurability of video encoding can be increased by defining plural regions of interest (ROIs) within a video frame or sequence of video frames to be encoded, and encoding each region according to an associated set of encoding parameter values (and settings).

Figure 3:
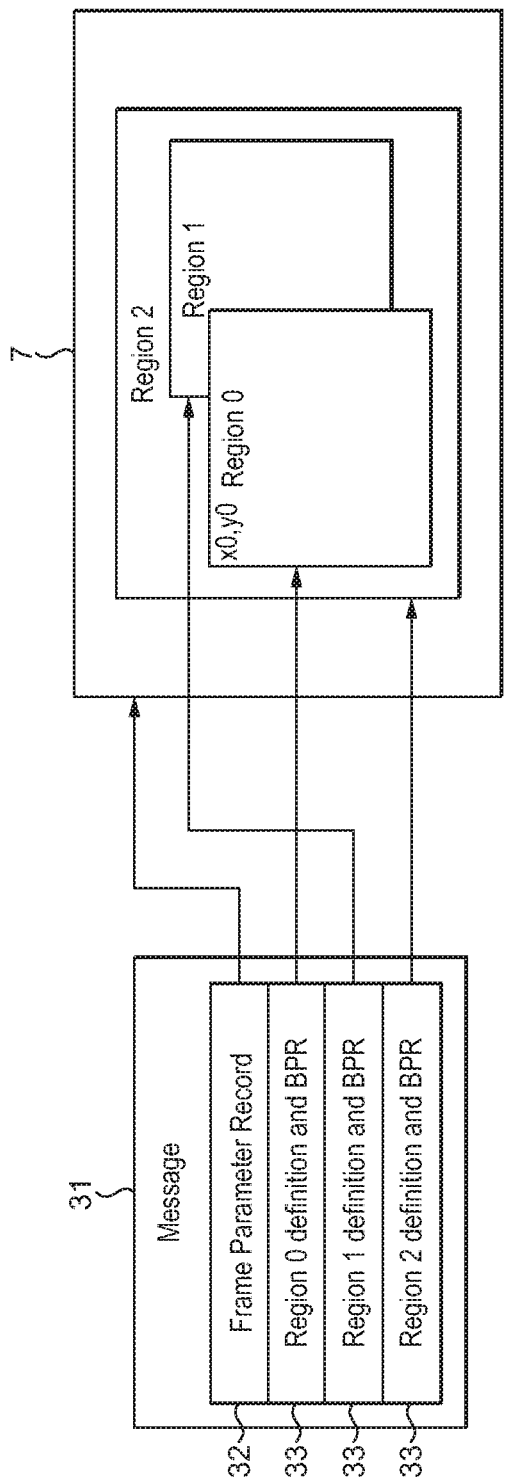
FIG. 3 shows an arrangement of a configuration message indicating how to encode regions of interest (ROIs) within a video frame.

FIG. 3 shows an example of this, wherein a video frame 7 to be encoded includes three rectangular regions of interest (ROIs): Region 0, Region 1 and Region 2. Each region can be defined in the video frame 7 by specifying, for example, its width, height and x and y positions of a particular corner (e.g. the top left corner), e.g. using four 16-bit integers.

In the example of FIG. 3, the encoding parameter values (and settings) to use to encode the video frame are defined by a "Frame Parameter Record" (FPR) (encoding configuration data that is associated with the video frame as a whole), and one "Block Parameter Record" (BPR) (set of region encoding configuration data) for each region of interest (ROI). The Frame Parameter Record (FPR) defines the encoding parameter values (and settings) to use to encode the video frame as a whole, while each Block Parameter Record (BPR) defines the encoding parameter values (and settings) to use to encode a particular region of interest (ROI).

In the example of FIG. 3, each of the three regions of interest (ROIs) within the video frame 7 are encoded using the encoding parameter values (and settings) defined by both the Frame Parameter Record (FPR) and the region's associated Block Parameter Record (BPR). Regions of the video frame 7 that are not covered by (not associated with) any of the three regions of interest (ROIs) are encoded using only encoding parameter values (and settings) defined by the Frame Parameter Record (FPR). Regions of the video frame 7 that are covered by two or three regions of interest (ROIs) (i.e. regions associated with two or more overlapping sub-regions) are encoded by the video encoder as if they are part of only the region of interest appearing first in the region of interest list included in the configuration message 31.

Table 1 shows encoding configuration parameters that a Frame Parameter Record (FPR) may define values (and settings) for in an embodiment of the technology described herein. As shown in Table 1, a Frame Parameter Record can define values and/or settings for parameters such as frame type, frame level quantisation, and maximum motion vector range, etc.

TABLE 1

Frame Parameter Record (FPR) parameters

| Parameter | Range | Comment |
|---|---|---|
| FrameType | 8-bit | b[0, 1] = IDR, I, P, B |
| | | b[2] = non-reference/reference |
| | | b[3] = constrained intra prediction |
| | | b[4] = displayable/reference only |
| RefL0 | 0 to 8 | Reference frame L0 to use (P, B only) |
| | | 0 = None; 1 to 8 = n'th previous ref frame |
| RefL1 | 0 to 8 | Reference frame L1 to use (B only) |
| | | 0 = None; 1 to 8 = n'th previous ref frame |
| QpY | 0 to 255 | Frame level Qp Luma |
| QpCbDelta | −12 to 12 | Frame level Qp Cb Delta from Luma |
| QpCrDelta | −12 to 12 | Frame level Qp Cr Delta from Luma |
| BlockTypes | 32-bit | Bitmap of block types to disable (e.g., P8 × 8, I8 × 8, P8 × 4, PSkip . . . ) |
| TileColumns | 0 to 16 | Number of tile columns |
| TileRows | 0 to 16 | Number of tile rows |
| FilterFlags | 8-bit | Frame loop filter configuration |
| SliceRows | 0 to 16 | Number of slices vertically |
| BPRType | 0 to 255 | 0 = No BPR configuration |
| | | 1 to 16 = This number of BPR regions |
| | | 255 = Line based BPR |
| MV Range | 4 × 16-bit | Motion vector range permitted by motion vectors in this frame |
| Display order | 16-bit | Specify the display order for this frame when decoded (e.g. for B frames) |

Table 2 shows example encoding configuration parameters that a Block Parameter Record (BPR) may define values (and settings) for in an embodiment of the technology described herein. As shown in Table 2, a Block Parameter Record can define parameters such as region type, region level quantisation (e.g. relative to frame level quantisation), and search areas, etc. The size of a BPR may be fixed, for example at 16 bytes per record.

TABLE 2

Block Parameter Record (BPR) parameters

| Parameter | Range | Comment |
|---|---|---|
| QPDelta | −127 to 128 | Qp delta from the frame level Qp (signalled in the bitstream if the block is not skipped) |
| IntraAvail | 5-bit | Limit intra prediction availability: down left, left, up-left, up, up-right |
| Force | 4-bit | Force certain block type: Intra, skip-L0, skip-L1, force Qp delta encoding |
| RefAvail | 2-bit | Reference frames available for searching: None, L0, L1, L0 + L1 |
| LSearch | 0 to 156 | Reference search area - max pixels to the left of the current 32 × 32 can be used |
| RSearch | 0 to 156 | Reference search area - max pixels to the right of the current 32 × 32 can be used |
| USearch | 0 to 70 | Reference search area - max pixels above the current 32 × 32 can be used |
| DSearch | 0 to 70 | Reference search area - max pixels below the current 32 × 32 can be used |
| MaxDist | 16-bit | Maximum distortion per pixel permitted for this 32 × 32 |
| Repeat | 16-bit | Number of times to repeat this BPR (line based BPR only) |

FIG. 3 also illustrates an arrangement not forming part of the technology described herein, whereby the encoding parameter values (and settings) to use to encode the video frame 7, as well as the definitions of the regions of interest (ROIs), are sent by the host processor to the video processor in a configuration message 31. In this arrangement, the configuration message 31 includes the Frame Parameter Record (FPR) 32, and for each region of interest (ROI), a definition of the respective region of interest (ROI) and an associated Block Parameter Record (BPR) 33.

In this arrangement, the number of regions of interest (ROI) defined by a single configuration message 31 may be limited, for example to 16, so as to limit the configuration message size, which could otherwise affect system performance.

Figure 4A:
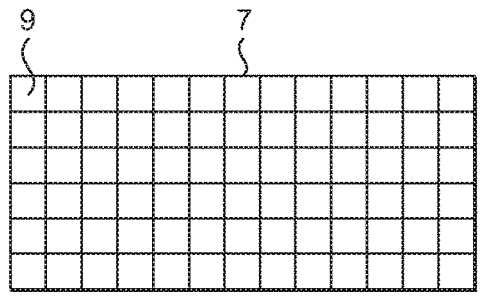
FIG. 4A shows an example video frame that has been divided into plural square tiles in accordance with an embodiment of the technology described herein.
Figure 4B:
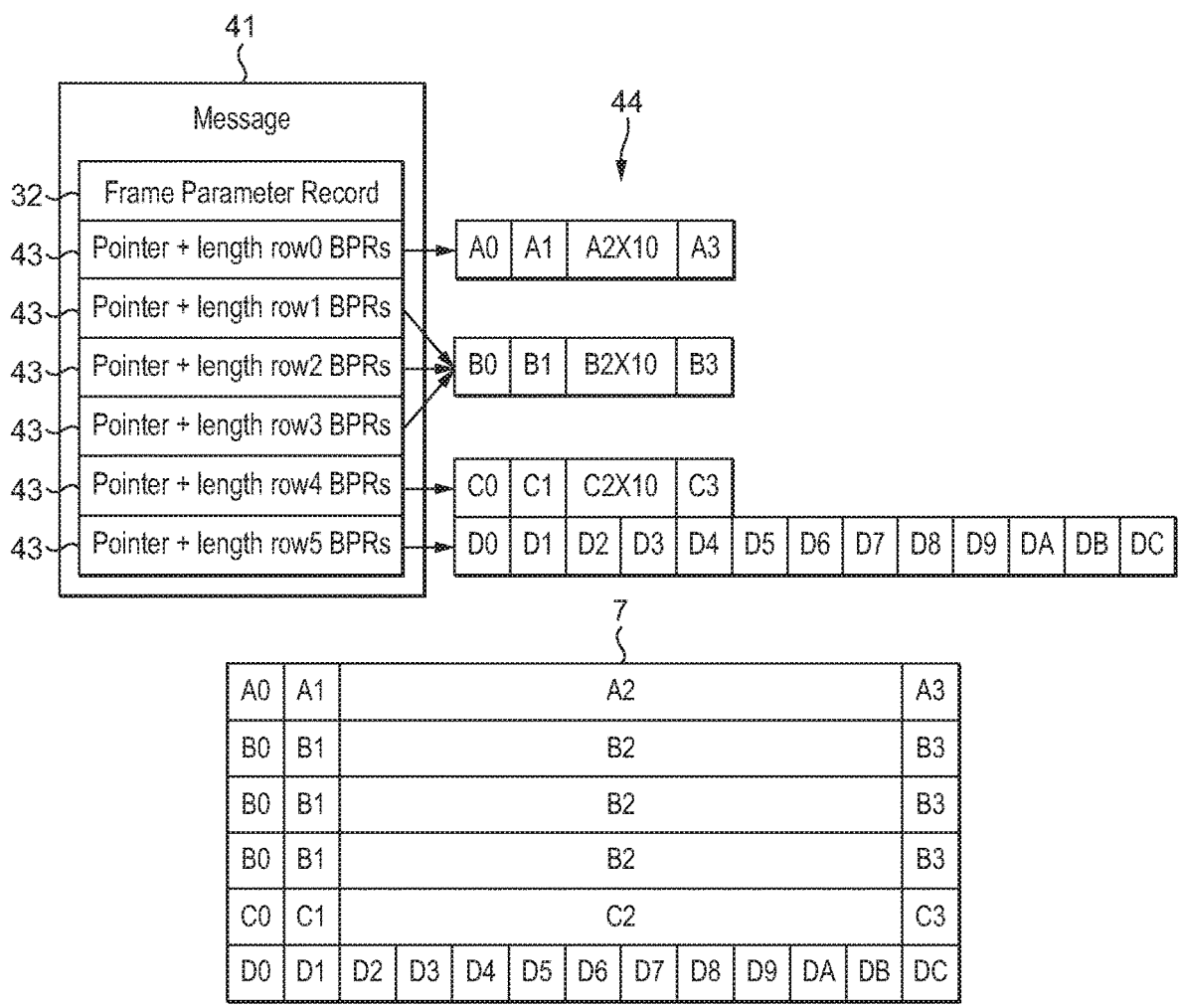
FIG. 4B illustrates an example of a configuration message indicating how to encode the video frame of FIG. 4A in accordance with an embodiment of the technology described herein.

FIGS. 4A and 4B illustrate an embodiment of the technology described herein.

As shown in FIG. 4A, in this embodiment, a video frame 7 to be encoded is divided into a plurality of predetermined non-overlapping, regularly sized, square sub-regions 9, that cover the entire video frame, referred to as "tiles" (or "blocks"). Each such tile 9 may be, for example, 8×8, 16×16, or 32×32 pixels in size. In the example shown in FIG. 4A, the video frame is divided into an array of 13×6 of such tiles. Other numbers of tiles could, of course, be used.

FIG. 4B illustrates a configuration message 41 used to indicate to the video processor 3 how to encode the video frame of FIG. 4A in this embodiment of the technology described herein. In this embodiment, as with the arrangement of FIG. 3, the configuration message 41 includes a Frame Parameter Record (FPR) 32, which defines the encoding parameter values (and settings) to use to encode the video frame as a whole. However, in contrast with the arrangement of FIG. 3, the configuration message 41 of FIG. 4B does not include definitions of the sub-regions, since they are predetermined and therefore already "known" by the video encoder. Accordingly, the amount of per sub-region data in the configuration message 41 of the embodiment of FIG. 4B is reduced, compared to the arrangement of FIG. 3.

Furthermore, as shown in FIG. 4B, the configuration message 41 does not include Block Parameter Records (BPRs). Instead, the configuration message 41 includes information 43 indicating the location of (streams or groups of) Block Parameter Records (BPRs) 44 that are stored elsewhere in a memory (e.g. in memory 5). This means, as discussed above, that the amount of per sub-region data in the configuration message 41 that is necessary to define encoding parameter values (and settings) (e.g. Block Parameter Records (BPRs)) is reduced in the embodiment of FIG. 4B compared to the arrangement of FIG. 3.

As shown in FIG. 4B, in this embodiment, the location indicating information included in the configuration message 41 comprises a list of descriptors 43, with each descriptor (set of location indicating information) in the descriptor list 43 comprising a pointer (e.g. an MVE virtual address pointer) pointing to a start memory location and a number (length) of following data bytes to read. Each descriptor in the list 43 indicates the location of (points to) Block Parameter Records (BPRs) stored in the memory that define the encoding parameter values (and settings) to use to encode a row of tiles that the video frame 7 has been divided into. Each row of tiles can accordingly be thought of as a group of sub-regions that is associated with one of the descriptors.

In the embodiment of FIG. 4B, the first descriptor in the list 43 points to the Block Parameter Records (BPRs) stored in the memory that define the encoding parameter values (and settings) to use to encode the first (top) row of tiles, the second descriptor in the list points to the Block Parameter Records (BPRs) stored in the memory that define the encoding parameter values (and settings) to use to encode the second row of tiles, and so on until the last descriptor in the descriptor list that points to the Block Parameter Records (BPRs) stored in the memory that define the encoding parameter values (and settings) to use to encode the last (bottom) row of tiles that the video frame 7 has been divided into. Thus the descriptors in the descriptor list 43 are ordered with respect to rows of tiles that the video frame 7 has been divided into.

FIG. 4B also illustrates how, in this embodiment, the Block Parameter Records (BPRs) 44 for a particular row of tiles are ordered with respect to the tiles in the row. Thus, in this embodiment, the first Block Parameter Record (BPR) for a row of tiles, e.g. D0, applies to the first tile in that row (i.e. the left most tile in the row), the second Block Parameter Record (BPR), e.g. D1, applies to the second tile in the row, and so on until the last Block Parameter Record (BPR), e.g. DC, which applies to the last tile in the row (i.e. the right most tile).

In the present embodiment, this ordering is exploited to compress the streams of Block Parameter Records (BPRs) stored in the memory. For example, FIG. 4B illustrates how, according to an embodiment, Block Parameter Records (BPRs) for a particular row of tiles are stored in the memory in a compressed format using run length encoding. In this embodiment, instead of always storing a separate Block Parameter Record (BPR) for each tile in a row in the memory, sequences of repeated Block Parameter Records (BPRs) (runs) are stored in the memory as a single Block Parameter Record (BPR), along with a number of Block Parameter Records (BPRs) that are repeated (count).

Thus, in the embodiment of FIG. 4B, the Block Parameter Records (BPRs) that define the encoding parameter values (and settings) to use to encode the last (bottom) row of tiles is stored in the memory using one Block Parameter Record (BPR) per tile (D0, D1, D2 . . . DC), since all of the Block Parameter Records (BPRs) are different. However, the Block Parameter Records (BPRs) to use to encode the first (top) row of tiles comprises the Block Parameter Record A2 which is repeated ten times. Thus, as shown in FIG. 4B, this is stored in the memory as a single copy of A2 along with a count value of 10. Accordingly, as shown in FIG. 4B, in this embodiment the first (left most) tile in the first (top) row is encoded using Block Parameter Record (BPR) A0, the second tile is encoded using Block Parameter Record (BPR) A1, the following ten tiles are encoded using Block Parameter Record (BPR) A2, and the last (right most) tile in the first (top) row is encoded using Block Parameter Record (BPR) A3.

FIG. 4B also illustrates another method of compression, according to an embodiment, where different descriptors in the descriptor list 43 can point to the same location in memory. This means that where streams of Block Parameter Records (BPRs) are the same, for example for two or more rows of tiles, a single copy of the repeated Block Parameter Records (BPRs) can be stored in memory and pointed to by two or more of the (location indicating) descriptors 43. Accordingly, the amount of data stored in the memory can be reduced. Thus in the embodiment of FIG. 4B, the second, third and fourth descriptors in the descriptor list 43 point to the same group of Block Parameter Records (BPRs) (B0, B1 . . . ) stored in the memory. As shown in FIG. 4B, the same Block Parameter Records (BPRs) (B0, B1 . . . ) are therefore used to encode these rows.

As illustrated in FIG. 4B, this method can be combined with the run length encoding method described above. Thus, as shown in FIG. 4B, the second, third and fourth descriptors in the descriptor list 43 point to the same group of Block Parameter Records (BPRs) which is stored in the memory using a single copy of Block Parameter Record (BPR) B2 along with a count value of 10, for example.

Figure 5:
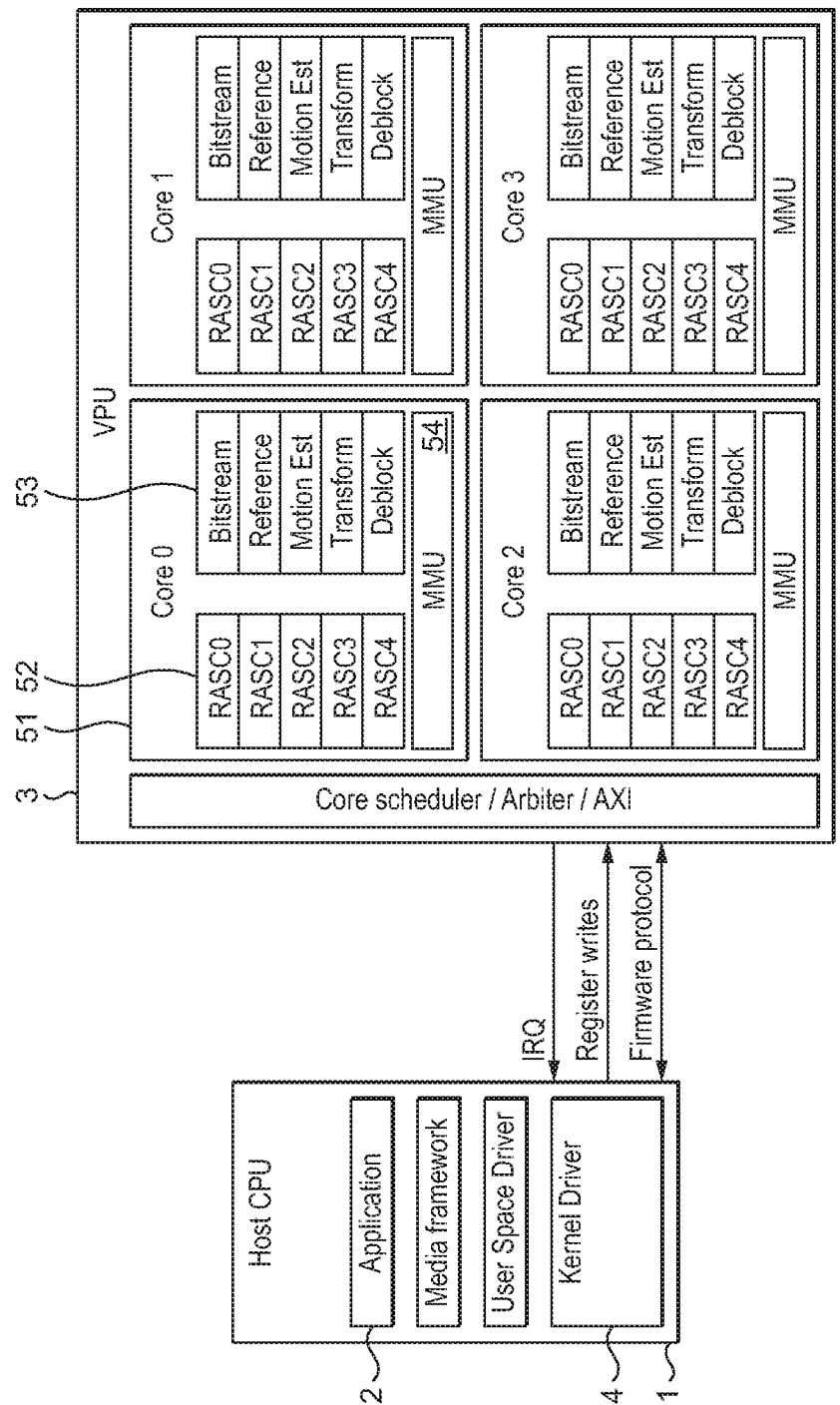
FIG. 5 shows schematically a multi-core video processing system that may be operated in accordance with an embodiment of the technology described herein.

FIG. 5 illustrates a multi-core video encoding system that may be operated in accordance with the technology described herein. As shown in FIG. 5, the video encoding system comprises a host processor 1 (e.g. a central processing unit (CPU)) and a multi-core video processor 3 (video processing unit (VPU)) that is operable to perform video encoding (a video encoder).

In the embodiment of FIG. 5, the video processor 3 includes four processing cores 51 (Core 0, Core 1, Core 2, Core 3), with each processing core comprising five micro-controllers 52 (RASC0, RASC1, RASC2, RASC3, RASC4), along with hardware pixel processing units 53 (Bitstream, Reference, Motion Est, Transform, Deblock), and a memory management unit (MMU) 54. Other arrangements are, of course, possible; for example there could be more than or less than four processing cores (e.g. one to eight processing cores), there could be more than or less than five micro-controllers within each processing core (e.g. one to eight micro-controllers), etc.

In the present embodiment, each processing job to be performed by the video processor 3 (e.g. entropy coding jobs, picture analysis and reconstructions jobs, etc.) will be taken by a core and processed in a pipelined fashion. Dependencies between jobs, buffering and memory management, etc. are managed by firmware and hardware protocols. To facilitate task scheduling, each micro-controller 52 can communicate with the other micro-controllers within the same core using inter-RASC communication protocols, and can communicate with other micro-controllers in different cores using inter-core communication protocols.

In an embodiment, processing jobs for different rows or lines of a video frame to be encoded are distributed to different processing cores, such that the video frame is encoded in parallel. To facilitate this, encoding configuration data specifying how to encode the video data must be appropriately distributed across the different processing cores.

This can be achieved by the host processor 1 sending to the multi-core video processor 3, a configuration message that includes a list of descriptors, with each descriptor comprising a pointer pointing to the encoding configuration data (e.g. a group of Block Parameter Records (BPRs)) stored in the memory that define the encoding parameter values (and settings) to use to encode a row or line of the video frame, such as is illustrated in FIG. 4B and described above. This means that a processing core can be provided with all of the encoding configuration data that is needed to encode a particular row or line independently of other rows or lines and processing cores.

Figure 6:
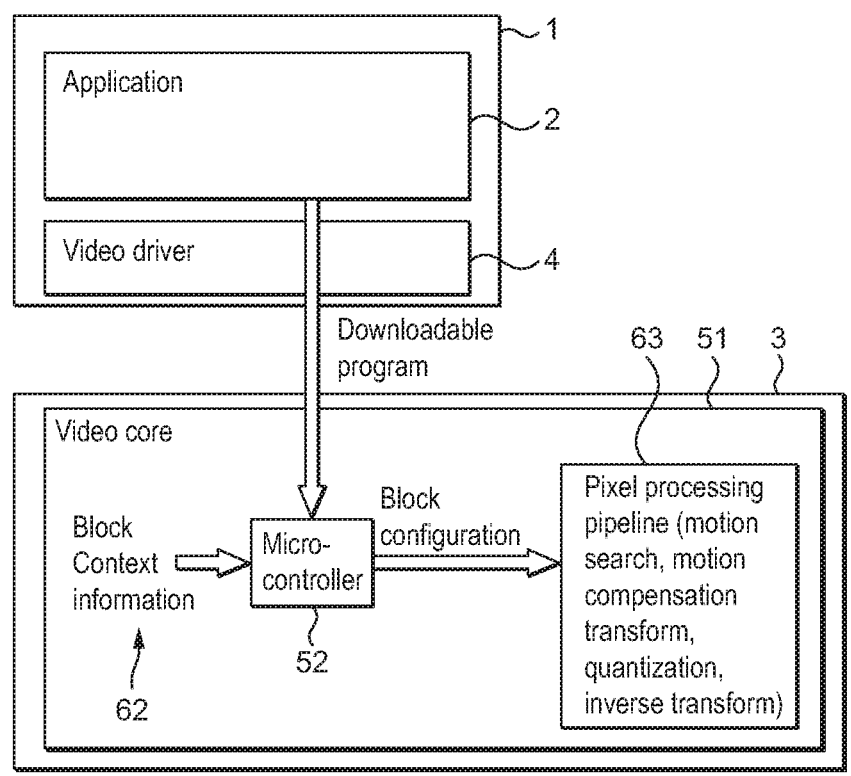
FIG. 6 shows schematically a host processor providing a program to a video processor in accordance with an embodiment of the technology described herein.

FIG. 6 illustrates a video encoding system operating according to another embodiment. As shown in FIG. 6, the video encoding system comprises a host processor 1 (e.g. a central processing unit (CPU)) and a video processor 3 (video processing unit (VPU)) that is configured by firmware running on the video processor 3 to perform video encoding (a video encoder). For clarity, the video processor 3 of FIG. 6 is shown as comprising a single video core 51 (processing core) which includes a single micro-controller 52. Other arrangements including plural processing cores and plural micro-controllers are, of course, possible.

As shown in FIG. 6, in the present embodiment, rather than (or as well as) the host processor 1 sending to the video encoder 3 data that directly defines encoding parameter values (and settings) to use to encode a video frame (e.g. (information indicating the location of) (a stream or group of) Block Parameter Records (BPRs), as described above), the host processor 1 sends to the video encoder 3 a downloadable program (instructions) that the video encoder 3 executes to output (generate) the encoding parameter values (and settings) to use to encode the video frame.

Such a program may be provided by an application of the video processing system. This means that the application (the application programmer) can tailor the operation of the program to the particular encoding operations desired. Accordingly, a greater level of encoding configurability can be achieved.

The program can be executed by the video encoder by the firmware for the video encoder calling the program as appropriate, e.g. at appropriate entry points and/or at appropriate times, e.g. using a dispatch table. In the present embodiment, the instructions are wrapped by the firmware for the video encoder. This means, for example, that the firmware for the video encoder can be fixed firmware and a greater level of encoding configurability can be achieved without, for example, modifying the firmware. Accordingly, a single fixed firmware can be provided and a greater level of encoding configurability can be provided without, for example, having to provide support for custom firmware.

In the present embodiment, the video frame to be encoded is divided into plural block sub-regions (or tiles, e.g. as described above). The program is then executed for each such block (tile) in order to generate the block configuration (e.g. a Block Parameter Record (BPR), as described above) to use to encode the respective block (tile). The program may executed in serial or in parallel by different processing cores for different blocks (tiles).

As shown in FIG. 6, to facilitate context (and content) dependent configurability, block context information 62 can be provided to the particular micro-controller 52 of the video processor 3 executing the program (instructions), and used as an input to the program. Thus the program (instructions) can be executed based on information that the video encoder 3 has access to, but that the host processor may not have access to. To facilitate this, in an embodiment, access to block context information 62 from the video encoder is provided through an interface that is able to access context information for the block (tile) being processed, as well for other blocks, e.g. being processed by a different processing core in parallel. Thus the block context information can include, for example, information regarding the content of or the encoding parameters of neighbouring blocks (tiles), e.g. such as quantisation parameters, motion vectors, and prediction modes for the neighbouring blocks (tiles), etc.

Other inputs to the program (instructions) can include (data specifying) details such as: frame width, frame height, (x,y) position, frame type, estimated number of frame bits so far, current frame quantisation parameters, region data information sent by the host processor on a frame by frame basis, block data streams sent by the host processor, etc.

Outputs of the program (instructions) can include (data specifying) details such as: start new slice, start new tile, quantisation parameters, force intra block, force inter block, force certain block type, set motion vector search range or search area, send region data information stream back to host processor in a data stream, set motion vector to a given value, force skip block, stream of per block data back to the host processor, etc.

In the present embodiment, as shown in FIG. 6, the output of the program (instructions) is provided to a pixel processing pipeline 63, which performs encoding operations based on the program output.

Figure 7:
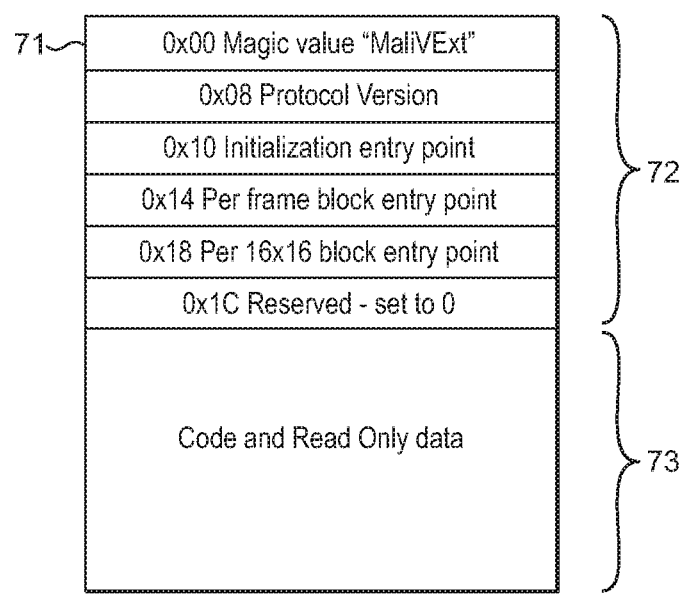
FIG. 7 shows a configuration message containing a program in accordance with an embodiment of the technology described herein.

FIG. 7 shows an arrangement whereby such a program is provided to the video encoder 3 using a configuration message 71. As shown in FIG. 7, in this embodiment, the configuration message 71 includes the program in the form of code and read only data 73, as well as a header 72 comprising data necessary for the instructions to be executed appropriately, which in this embodiment includes appropriate entry points for the firmware of the video processor to call the instructions for execution. The firmware running on the video processor reads the code and read only data 73 upon receiving the configuration message 71.

The configuration message 71 of FIG. 7 can be added to the message queue illustrated in FIG. 2. The configuration message then applies to the following frame message and each subsequent frame message in the message queue until a new configuration message is encountered in the queue (in a similar manner to the configuration messages described above).

Figure 8:
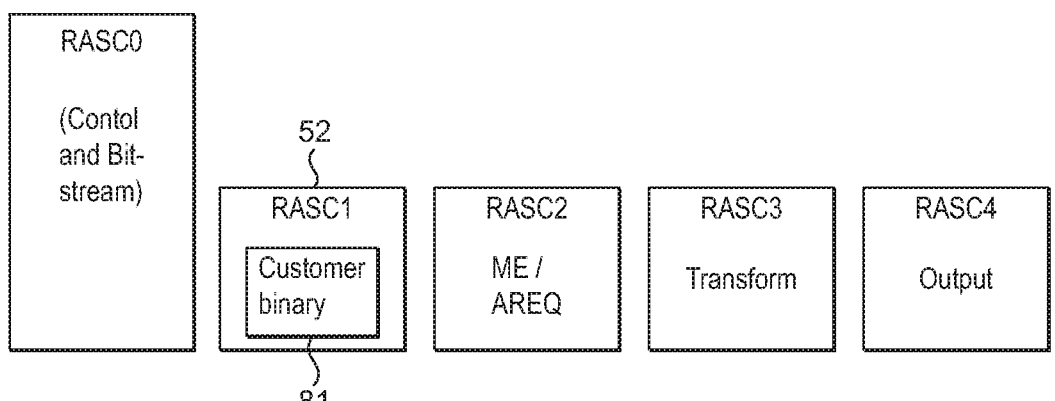
FIG. 8 illustrates an example of a micro-controller of a video processor executing a program in accordance with an embodiment of the technology described herein.

FIG. 8 illustrates an embodiment where an application-provided binary program 81 is downloaded to and executed by a specific micro-controller of the video processing system, e.g. RASC1 52 in the example of FIG. 7. The program may be wrapped by the firmware for the video processor, and the firmware may branch into the program at defined times using a dispatch table in the binary header. The program can only be installed for non-protected sessions, and the specific micro-controller executing the program 52 (RASC1) is not used for other processing. The program can thereby be "sandboxed" so that its execution impacts minimally (or not at all) upon, e.g. the performance and cache usage of other firmware components, and other processing by the video encoder 3, e.g. processing by other micro-controllers RASC0, RASC2, RASC3, and RASC4.

Figure 9:
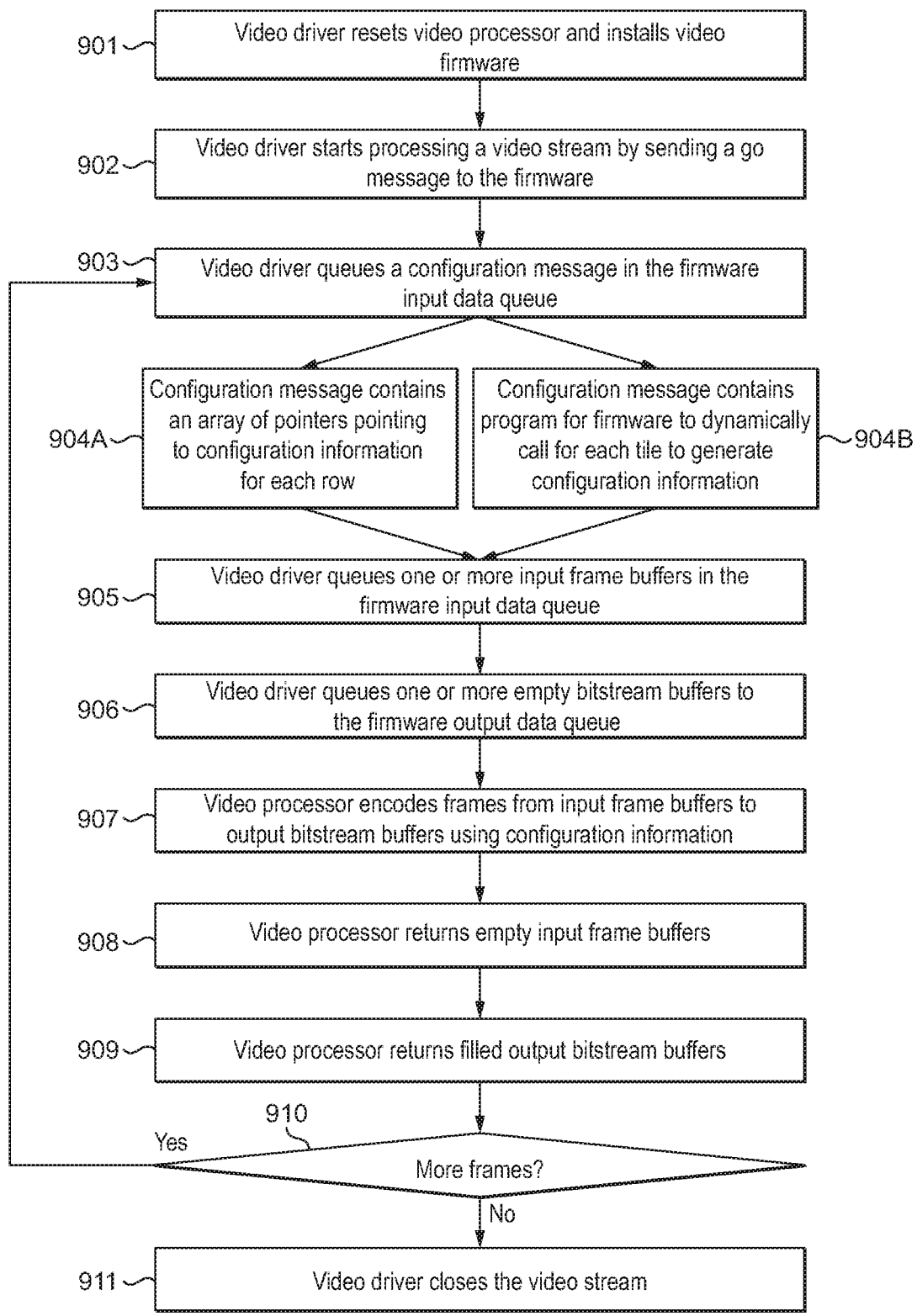
FIG. 9 shows schematically the operation of a video processing system in accordance with an embodiment of the technology described herein.

FIG. 9 shows schematically the operation of a video processing system in accordance with an embodiment of the technology described herein. As shown in FIG. 9, in the present embodiment, at the start of a video encoding session, a video driver (running on a host processor) first resets the video processor (video encoder) and installs video firmware on the video processor (step 901). The video processor executes (runs) the firmware to configure the video processor to encode video data for the video encoding session. The video driver then starts the processing of a video stream (video data) for the video encoding session by sending a "go" message to the firmware of the video processor (step 902).

The video driver then queues a configuration message to the firmware input data queue (message queue) (step 903). In this embodiment, the queued configuration message contains either an array of pointers pointing to (streams of) configuration information (encoding configuration data) for each row of the video frame (step 904A), or a program for the firmware to dynamically call for each block (tile) of the video frame to generate configuration information (encoding configuration data) for that block (tile) (e.g., as described above) (step 904B).

The video driver then provides one or more input video frames to be encoded to the video processor by queuing one or more frame messages in the firmware input data queue (message queue) (step 905). In this embodiment, each queued frame message contains one or more pointers pointing to an input frame buffer storing YUV information for a video frame. The video driver also provides appropriate output buffers by queuing one or more messages indicating (empty) bitstream buffers to use in the firmware output data queue (step 906).

The video processor (video encoder) then encodes the one or more video frames (step 907). This is done by, for each video frame: reading video data from an input frame buffer using the pointer(s) included in an associated frame message; encoding the video data using configuration information (encoding configuration data) that has either been read using the pointer(s) included in the configuration message, or generated by the program; and storing the output encoded video data for the respective video frame in the next output bitstream buffer "queued" in the firmware output data queue. Once the encoding has been performed, the video processor returns empty input frame buffers (step 908) and filled output bitstream buffers (step 909).

At step 910, where there are more video frames to be encoded using a different configuration, then the video driver queues a new configuration message (step 903) and the subsequent steps (step 904 onwards) are repeated for that configuration message. Otherwise, and once all video frames to be encoded have been encoded, the video driver closes the video stream (step 911).

It can be seen from the above, the technology described herein, in its embodiments at least, provides a mechanism whereby video encoding operations can be performed with a high degree of configurability. This is achieved in embodiments of the technology described herein at least by including in a configuration message sent by a host processor to a video encoder, information that indicates the location of encoding configuration data that is stored elsewhere in a memory.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a video processing system that includes a host processor, a video encoder and a memory, the method comprising:
   when encoding video data:
   the host processor sending a configuration message to the video encoder, the configuration message indicating to the video encoder how to encode a video frame and including information indicating a location of encoding configuration data stored in the memory; and
   the video encoder:
   receiving the configuration message;
   using the location indicating information to read the encoding configuration data from the memory; and
   encoding the video frame in accordance with the encoding configuration data read from the memory.

2. The method of claim 1, wherein:
   the configuration message includes encoding configuration data that indicates how the video frame as a whole is to be encoded;
   the encoding configuration data stored in the memory comprises sub-region encoding configuration data that indicates how plural sub-regions that the video frame has been divided into are to be encoded; and the method comprises:
   the video encoder encoding the video frame in accordance with sub-region encoding configuration data read from the memory using the location indicating information included in the configuration message and the encoding configuration data that indicates how the video frame as a whole is to be encoded included in the configuration message.

3. The method of claim 1, wherein:

the location indicating information comprises, for each of one or more groups of sub-regions that the video frame has been divided into, a set of location indicating information indicating the location of sub-region encoding configuration data stored in the memory that indicates how the respective group of sub-regions is to be encoded.

4. The method of claim 1, wherein:

the encoding configuration data stored in the memory comprises one or more sets of sub-region encoding configuration data, each set of sub-region encoding configuration data indicating how a sub-region of plural sub-regions that the video frame has been divided into is to be encoded; and two or more different sub-regions or groups of sub-regions of the video frame share the same single set of sub-region encoding configuration data stored in the memory.

5. The method of claim 1, wherein the video frame is divided into a predefined array of sub-regions.

6. The method of claim 2, wherein:

the sub-region encoding configuration data is arranged in a particular order; and the method comprises the video encoder encoding one or more sub-regions or groups of sub-regions of the video frame in the particular order.

7. The method of claim 1, wherein:

the encoding configuration data defines values of one or more parameters to be used as inputs and/or configuration settings for instructions to be executed by the video encoder to generate an output that indicates how to encode the video frame.

8. The method of claim 1, wherein:

the configuration message indicates instructions to be executed by the video encoder to generate an output that indicates how to encode the video frame;

the video encoder is configured by firmware running on the video encoder to encode video data; and the method comprises:

the firmware running on the video encoder reading the instructions indicated by the configuration message; and the video encoder:

executing the instructions read by the firmware to generate an output that indicates how to encode the video frame; and encoding the video frame using the generated output.

9. The method of claim 7, wherein the instructions are executed by the video encoder using restricted resources of the video encoder.

10. A video processing system, the video processing system comprising:

a host processor;

a video encoder; and a memory;

wherein the host processor is configured to send a configuration message to the video encoder, the configuration message indicating to the video encoder how to encode a video frame and including information indicating a location of encoding configuration data stored in the memory; and the video encoder is configured to:

receive configuration messages sent by the host processor;

use location indicating information included in a received configuration message to read encoding configuration data from the memory; and encode a video frame in accordance with the encoding configuration data read from the memory.

11. The video processing system of claim 10, wherein:

configuration messages include encoding configuration data that indicates how a video frame as a whole is to be encoded;

encoding configuration data stored in the memory comprises sub-region encoding configuration data that indicates how plural sub-regions that a video frame has been divided into are to be encoded; and the video encoder is configured to encode a video frame in accordance with sub-region encoding configuration data read from the memory using the location indicating information included in a configuration message and encoding configuration data that indicates how the video frame as a whole is to be encoded that is included in the configuration message.

12. The video processing system of claim 10, wherein:

the location indicating information included in a configuration message comprises, for each of one or more groups of sub-regions that a video frame has been divided into, a set of location indicating information indicating the location of sub-region encoding configuration data stored in the memory that indicates how the respective group of sub-regions is to be encoded.

13. The video processing system of claim 10, wherein:

encoding configuration data stored in the memory comprises one or more sets of sub-region encoding configuration data, each set of sub-region encoding configuration data indicating how a sub-region of plural sub-regions that a video frame has been divided into is to be encoded; and two or more different sub-regions or groups of sub-regions of a video frame share the same single set of sub-region encoding configuration data stored in the memory.

14. The video processing system of claim 10, wherein a video frame is divided into a predefined array of sub-regions.

15. The video processing system of claim 11, wherein:

sub-region encoding configuration data is arranged in a particular order; and the video encoder is configured to encode one or more sub-regions or groups of sub-regions of a video frame in the particular order.

16. The video processing system of claim 10, wherein:

encoding configuration data defines values of one or more parameters to be used as inputs and/or configuration settings for instructions to be executed by the video encoder to generate an output that indicates how to encode a video frame.

17. The video processing system of claim 10, wherein:

configuration messages indicate instructions to be executed by the video encoder to generate an output that indicates how to encode a video frame;

the video encoder is configured by firmware running on the video encoder to encode video data;

the firmware running on the video encoder is configured to read instructions indicated by a configuration message: and the video encoder is further configured to:

execute instructions read by the firmware to generate an output that indicates how to encode a video frame; and encode the video frame using the generated output.

18. The video processing system of claim 16, wherein the video encoder is configured to execute the instructions using restricted resources of the video encoder.

19. A computer readable storage medium storing software code which when executing on a processor performs a method of operating a video processing system that includes a host processor, a video encoder and a memory, the method comprising:

when encoding video data:

the host processor sending a configuration message to the video encoder, the configuration message indicating to the video encoder how to encode a video frame and including information indicating a location of encoding configuration data stored in the memory; and the video encoder:

receiving the configuration message;

using the location indicating information to read the encoding configuration data from the memory; and encoding the video frame in accordance with the encoding configuration data read from the memory.

* * * * *